March 17, 1970   E. L. MOORE   3,501,674
HIGH FREQUENCY PORTABLE POWER SUPPLY FOR A FLUORESCENT LAMP
Filed July 13, 1967
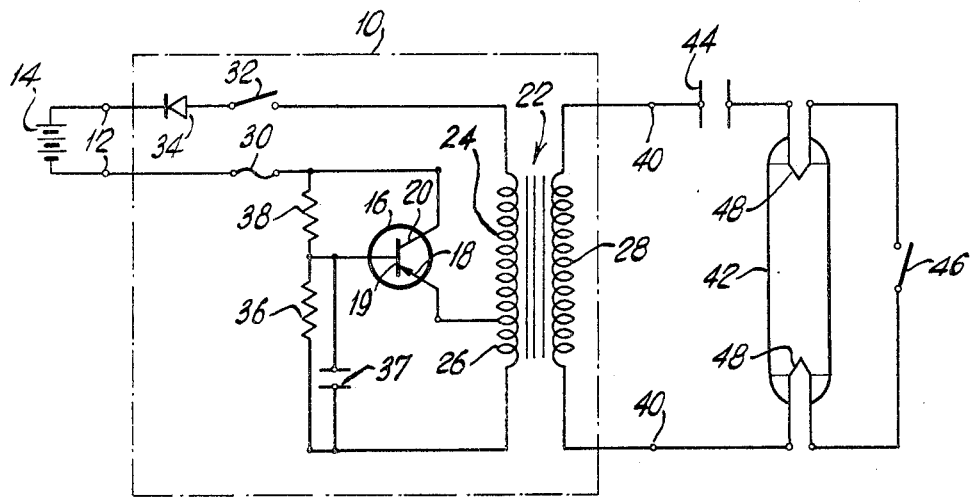
INVENTOR
EMMETT L. MOORE
BY
Hopgood & Calimafde
ATTORNEYS 3,501,674
HIGH FREQUENCY PORTABLE POWER SUPPLY
FOR A FLUORESCENT LAMP
Emmett L. Moore, New York, N.Y., assignor to Battery
Lite Corporation, Long Island City, N.Y., a corporation
of Delaware
Filed July 13, 1967, Ser. No. 653,265
Int. Cl. H05b 41/14
U.S. Cl. 315—105                    1 Claim

ABSTRACT OF THE DISCLOSURE

A solid state power supply circuit for a fluorescent lamp in which an oscillator is employed to convert a low level DC source voltage to a higher level AC operating voltage having a frequency selected to significantly increase the light output while also reducing the current required from the DC source.

Background of the invention

Power supplies for providing operating potential to fluoroescent lamps from a battery have been known for some time. These power supplies employ a transistorized oscillator having a frequency generally within the range from 600 to 1000 cycles. However, the operation of these oscillators at such frequencies causes considerable annoyance to those in close proximity to the power supply. Additionally, while fluorescent lamps are more efficient than incandescent lamps, in terms of the light output produced for a given power input, any improvement in the operating efficiency would be very desirable so that the battery source will last longer.

Objects of the invention

It is a principal object of this invention to provide a novel solid state power supply for operating fluorescent lamps more efficiently from a limited power source such as a battery.

Another object of the invention is to increase the amount of light output from a given size fluorescent lamp with a smaller power input than has been required heretofore.

Still another object is to eliminate the annoyance resulting from the audible frequency vibrations produced by prior art power supplies.

General summary of the invention

Briefly, in accordance with one aspect of the invention, a power supply is provided for operating a fluorescent lamp from a low voltage DC supply such as a battery. The power supply employs a semiconductor device such as a transistor, with a transformer to convert the low DC voltage to a higher AC voltage for operating the lamp. In accordance with the principles of this invention, means are provided for operating the power supply at a frequency which is selected (1) to increase the efficiency of operation of the lamp so that a greater light output is provided from a smaller power input than was heretofore required and (2) to eliminate the audible frequency vibrations found to be an annoying characteristic of prior art devices.

Description of preferred embodiment

Referring now to the drawing, there is provided a transistorized oscillator power supply circuit which is the portion of the circuit shown in the drawing within the dashed line rectangular indicated by the numeral 10. This circuit includes a pair of input terminals 12 and a pair of output terminals 40. A low voltage DC power source such as, for example, a battery 14 provides power to the input terminals 12.

The power supply circuit 10 includes a transistor 16 having emitter, base and collector electrodes 18, 19 and 20 respectively. A step-up transformer 22 is provided and has a first primary winding 24, a second primary winding 26 and a secondary winding 28. The first primary winding 24 is connected in the emitter-to-collector current path between the input terminals 12 with a fuse 30, an on-off switch 32 and a diode 34 also in series in this path. The diode 34 is provided as a safety measure to prevent destruction of the transistor 16 by accidental reverse polarity connection of the input terminals 12 to the battery 14.

The second primary winding 26 is connected between the emitter 18 and base 19 through a resistor-capacitor combination 36–37. The resistor 36, with another resistor 38, provide biasing for the base of the transistor 16.

The circuit of the drawing also shows a fluorescent lamp 42 connected to the output terminals 40 of the power supply 10 through a current limiting capacitor 44. A switch 46 is connected to allow current to pass through the starting filaments 48 of the tube 42. This switch 46 may be opened after the lamp has been started or, if desired, it may be eliminated with a permanent connection in lieu thereof, provided that a proper size capacitor 44 is employed.

When the on-off switch 32 is turned on, the power supply circuit 10 oscillates, producing an AC output voltage at the output terminal 40. The manner of operation of this circuit will be understood by those knowledgeable in the art without further discussion.

In accordance with this invention, I have discovered that the light output from a fluorescent lamp can be substantially increased by raising the frequency of the lamp operating voltage to values far beyond those conventionally employed. I have also discovered the further surprising fact that this increase in light output can be obtained at a significantly lower power input than is necessary at the conventional operating frequencies.

I have found that it is preferable to employ an operating frequency generally in the region of 17,500 cycles per second, which is the approximate frequency at which the greatest operating efficiency is produced. Frequencies somewhat above and below this figure also produce superior operating efficiency, however the improvement in such efficiency is less with greater departures from this preferred frequency. Although this invention is not limited to any specific range, I prefer to employ frequencies generally within the range of 16,000 to 20,000 cycles per second, since these frequencies are at the upper region and beyond the range of human hearing and consequently do not cause the usual annoyance encountered with the lower frequencies of prior art oscillators. The 17,500 c.p.s. frequency is preferred not only because it is beyond the hearing range of most people and for greater efficiency it produces, but also because the lamp life becomes somewhat shorter generally above 18,000 c.p.s.

The factors which affect the frequency of operation are the value of the resistor 36, the value of the capacitor 37, the first and second primary windings 24 and 26 and also the configuration of material of the core of the transformer 22. Those skilled in the art will appreciate the manner in which these components can be varied in order to produce the frequencies contemplated in accordance with this invention.

The advantages of the invention can be more fully appreciated from the fact that a 15 watt fluorescent lamp will produce a light output intensity approximately 12–15% greater, with an operating voltage frequency of approximately 17,500 c.p.s., while drawing a current from a 12-volt battery that is approximately 5 to 10 percent less than that required with a 1,000 c.p.s. supply. My experiments have also confirmed that corresponding improvements in operating efficiency and reductions in the power input required are also obtainable with lamps of from 4 to 80 watt ratings. It is believed that the greater operating efficiency and lower power required are due to a more continuous excitation of the tube fluorescent powder than is possible at the conventional frequencies.

The power supply of this invention is of great importance when it is realized that, in this day of widespread use of numerous portable electrical devices, it is very important that as many devices operate in the most efficient manner possible so that battery weight, life, and time between recharging are the most favorable that can be achieved. This invention is very useful for powering fluorescent lamps in a number of portable and mobile applications such as trucks, boats, airplanes, mobile homes, camping units and many others.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:
1. A high frequency power supply for a fluorescent lamp comprising:
   a circuit continuously oscillating at a frequency of 16,000 to 20,000 cycles per second including a transistor having emitter, base and collector electrodes for converting low voltage D-C power to A-C power,
   a first transformer primary winding with a first terminal directly connected to said emitter and a second terminal connected in series to the collector through a diode and a low voltage power supply,
   a second transformer primary winding with one terminal connected to the first terminal of said first winding and the other terminal connected to said base through a parallel connected R-C circuit,
   said base connected to said low voltage power supply through a resistor,
   a secondary transformer winding electromagnetically coupled to said first and second transformer windings and connected to output terminals,
   a fluorescent lamp connected across said output terminals through a capacitor,
   whereby said lamp is continuously energized at a frequency of 16,000 to 20,000 cycles per second in order to more efficiently utilize the available power and provide for the noise free operation of said lamp.

References Cited
UNITED STATES PATENTS

| | | | |
|---|---|---|---|
| 2,896,126 | 7/1959 | Hoff | 307—202 X |
| 2,923,856 | 2/1960 | Greene et al. | 315—138 |
| 2,982,881 | 5/1961 | Reich | 315—205 |
| 3,146,406 | 8/1964 | Wilting | 331—113 |

FOREIGN PATENTS

| | | |
|---|---|---|
| 1,123,405 | 6/1956 | France. |
| 1,236,083 | 6/1960 | France. |

JAMES W. LAWRENCE, Primary Examiner

E. R. LA ROCHE, Assistant Examiner

U.S. Cl. X.R.

315—206; 331—108